[12] United States Patent
Honda et al.

(10) Patent No.: US 12,491,474 B2
(45) Date of Patent: Dec. 9, 2025

(54) CARTRIDGE ATTACHMENT STRUCTURE AND CARTRIDGE

(71) Applicant: ORGANO CORPORATION, Tokyo (JP)

(72) Inventors: Kaoru Honda, Tokyo (JP); Tadashi Sato, Tokyo (JP); Akihiro Suzawa, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 354 days.

(21) Appl. No.: 18/275,136

(22) PCT Filed: Jan. 6, 2022

(86) PCT No.: PCT/JP2022/000223
§ 371 (c)(1),
(2) Date: Jul. 31, 2023

(87) PCT Pub. No.: WO2022/168522
PCT Pub. Date: Aug. 11, 2022

(65) Prior Publication Data
US 2024/0091707 A1    Mar. 21, 2024

(30) Foreign Application Priority Data
Feb. 5, 2021 (JP) ................. 2021-017495

(51) Int. Cl.
*B01D 61/08*    (2006.01)
*B01D 15/22*    (2006.01)
(Continued)

(52) U.S. Cl.
CPC ............. *B01D 61/08* (2013.01); *B01D 15/22* (2013.01); *B01D 15/361* (2013.01); *C02F 1/283* (2013.01);
(Continued)

(58) Field of Classification Search
CPC ...... B01D 61/08; B01D 15/22; B01D 15/361; B01D 2313/44; B01D 2313/56;
(Continued)

(56) References Cited

U.S. PATENT DOCUMENTS 3,727,764 A    4/1973   Ogden
5,397,462 A    3/1995   Higashijima et al.
(Continued)

FOREIGN PATENT DOCUMENTS

CN    101244351 A    8/2008
CN    106629932 A    5/2017
(Continued)

OTHER PUBLICATIONS

Office Action dated Jan. 7, 2025 in Japanese family member Patent Application No. 2021-017495, with English language translation thereof.
(Continued)

*Primary Examiner* — Terry K Cecil
(74) *Attorney, Agent, or Firm* — Greenblum & Bernstein, P.L.C.

(57) ABSTRACT

A cartridge attachment structure includes: a cover whose one end is attached to a pivot shaft for opening and closing a storage space; a support member attached to the pivot shaft and supporting a cartridge; and a pair of lifting-up members attached to the cover such that the cartridge can be sandwiched along the side surface of the cartridge. A groove is formed on each of the opposing inner surfaces of the lifting-up members to receive a projection 16 formed on the side surface of the cartridge. The groove is curved such that the bottom surface of the cartridge moves away from the support member when the protrusion slides along the groove as the cover rotates about the pivot shaft.

15 Claims, 6 Drawing Sheets

(51) Int. Cl.
*B01D 15/36* (2006.01)
*C02F 1/28* (2023.01)
*C02F 1/42* (2023.01)
*C02F 1/44* (2023.01)

(52) U.S. Cl.
CPC ............... *C02F 1/42* (2013.01); *C02F 1/441* (2013.01); *B01D 2313/44* (2013.01); *C02F 2201/006* (2013.01); *C02F 2307/10* (2013.01)

(58) Field of Classification Search
CPC .......... B01D 61/081; C02F 1/283; C02F 1/42; C02F 1/441; C02F 2201/006; C02F 2307/10; C02F 1/003; C02F 2201/004
See application file for complete search history.

(56) References Cited

U.S. PATENT DOCUMENTS

| | | | |
|---|---|---|---|
| 2001/0045386 A1 | 11/2001 | Stankowski et al. | |
| 2011/0247974 A1 | 10/2011 | Gale et al. | |
| 2020/0338481 A1 | 10/2020 | Lautzenheiser et al. | |
| 2022/0024781 A1* | 1/2022 | Keel | C02F 1/003 |

FOREIGN PATENT DOCUMENTS

| | | |
|---|---|---|
| CN | 206198845 U | 5/2017 |
| CN | 107321041 A | 11/2017 |
| CN | 212262593 U | 1/2021 |
| DE | 10 2018 129 752 A1 | 5/2020 |
| JP | 48-76150 | 10/1973 |
| JP | 57-25695 Y2 | 6/1982 |
| JP | 2003-525113 A | 8/2003 |
| JP | 2004-154673 A | 6/2004 |
| JP | 2010-504849 A | 2/2010 |
| JP | 2011-224481 A | 11/2011 |
| JP | 2012-501832 A | 1/2012 |
| TW | M303207 U | 12/2006 |
| WO | 01/64312 A1 | 9/2001 |
| WO | 2010/027989 A2 | 3/2010 |
| WO | 2015/192862 A1 | 12/2015 |
| WO | 2019/119066 A1 | 6/2019 |
| WO | 2020/201482 A1 | 10/2020 |

OTHER PUBLICATIONS

Office Action dated May 9, 1015, issued in Chinese family member application No. 111101596 with English language translation thereof.
International Search Report issued Mar. 8, 2022 in International Bureau of WIPO Patent Application No. PCT/JP2022/000223, with an English translation thereof.
Written Opinion issued issued Mar. 8, 2022 in International Bureau of WIPO Patent Application No. PCT/JP2022/000223, with an English translation thereof.
Office Action, dated Aug. 29, 2025, issued in Chinese family member patent application No. 202280013341.5 with English language translation thereof.

* cited by examiner

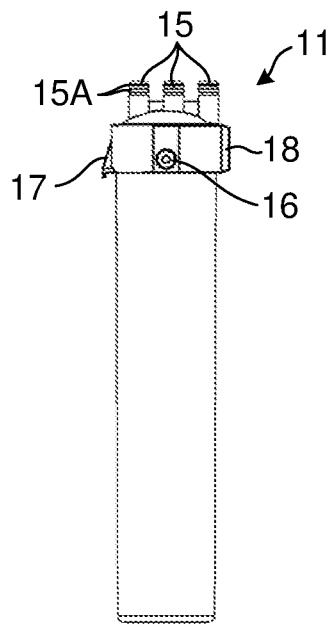
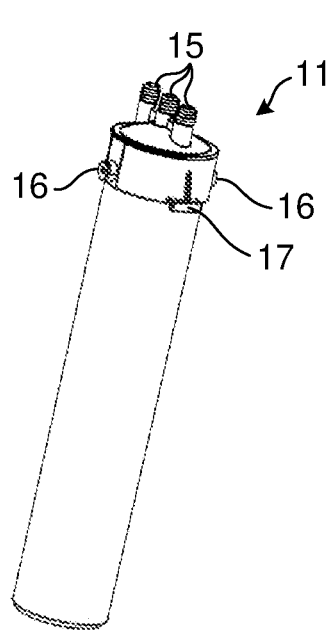
FIG. 3A    FIG. 3B
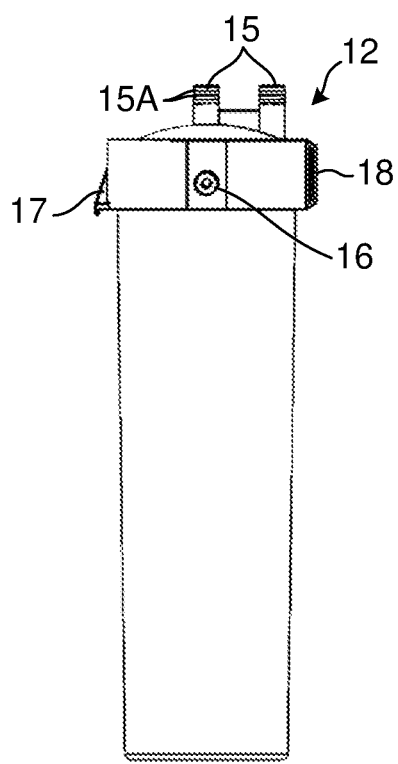
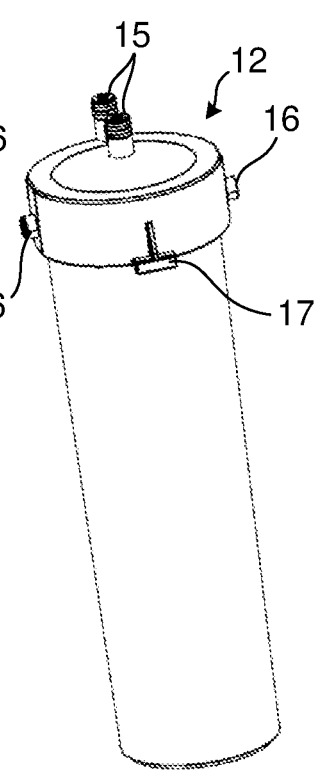
FIG. 4A    FIG. 4B    FIG. 4C

CARTRIDGE ATTACHMENT STRUCTURE AND CARTRIDGE

TECHNICAL FIELD

The present invention relates to an attachment structure for detachably installing a cartridge, which is used in a liquid treatment apparatus such as a pure water production apparatus to store consumables, to the liquid treatment apparatus, and a cartridge adapted to such an attachment structure.

BACKGROUND ART

A pure water production apparatus that produces pure water from water to be treated such as tap water includes devices such as, for example, an activated carbon treatment device that includes activated carbon, a reverse osmosis membrane device that includes a reverse osmosis membrane, an ion exchange device that includes an ion exchanger such as an ion exchange resin, and an ultraviolet oxidation device. Activated carbon, reverse osmosis membranes, ion exchange resins, and the like are used for producing pure water, but these are consumables and must be replaced regularly or as needed. There is a need to reduce the labor required to replace consumables, and it is also necessary to prevent dust and contaminants from being brought into the pure water production apparatus when replacing these consumables. Therefore, in the pure water production apparatus, the consumables are stored in a cartridge (also called a filter cartridge or filter assembly) so that the entire cartridge can be detachably installed in the main body of the pure water production apparatus while preventing the inside of the pure water production apparatus from being contaminated. The cartridge is provided with an inlet and an outlet for the water to be treated. By attaching the cartridge upward, for example, to a manifold or cap provided in the main body of the pure water production apparatus, pipes in the main body of the pure water production apparatus are connected to the inlet and outlet of the water to be treated in the cartridge, respectively, and then the water to be treated can be passed through the cartridge. A cartridge containing activated carbon is called, for example, an activated carbon cartridge, and a cartridge containing ion exchange resins is called, for example, an ion exchange resin cartridge.

An attachment structure is disclosed in Patent Literature 1 in which a pedestal having, for example, an L-shaped cross section that can be pulled down forward by being rotatable around a pivot axis is provided, a cylindrical cartridge is placed and fixed on the pedestal in the pulled down state, and then the pedestal is made in an upright position to connect the cartridge to a main body of a liquid treatment apparatus. In this structure, when the cartridge is placed on the pedestal, it is necessary to fix the cartridge to the pedestal by means of a fastening piece, and it cannot be necessarily said that the working efficiency is improved. Further, since the cartridge in the connected state is not structured to be pressed against the main body of the liquid treatment apparatus, liquid leakage may occur at the connecting portion between the cartridge and the main body of the liquid treatment apparatus. In order to prevent liquid leakage, it is necessary to separately perform position adjustment work, which reduces workability.

Disclosed in Patent Literature 2 is a configuration in which a cartridge is connected to a manifold by attaching a cup-shaped outer box member to the manifold so as to open and close with respect to the manifold via a hinge, accommodating the cartridge inside the outer box member with the outer box member opened, and then closing the outer box and fixing the outer box in that state. A similar configuration is also disclosed in Patent Literature 3. In the cartridge attachment structures described in Patent Literatures 2 and 3, when the cartridge is attached or detached, the outer box member is in an open state while hanging from the manifold. In the operation of attaching the cartridge, the user holds the cartridge by hand and inserts the cartridge into the outer box member in the open state. A large cartridge weighs several kilograms, and it is necessary to work carefully so as not to hit the manifold with the cartridge, so the workability of this operation is not good.

Patent Literature 4 discloses an attachment structure for installing a cartridge by fitting a cylindrical portion at the tip end of the cartridge into a circular space of a circular manifold. In this attachment structure, a fixing member, which is a linear protrusion extending in the circumferential direction, is provided on the outer peripheral surface of the cylindrical portion of the cartridge, a groove-like slide passage capable of receiving the fixing member is formed in the inner wall of the circular space of the circular manifold, and a step is formed on the inner wall of the circular space so that the fixing member can slide in contact with the step to be guided into the slide passage. However, in the cartridge attachment structure described in Patent Literature 4, since it is necessary to position the tip end of the cartridge with respect to the circular space of the manifold and twist the cartridge while lifting the cartridge, there is a risk that work become difficult when the mass of the cartridge is large.

In order to solve the problem of the technique described in Patent Literature 4 that workability is poor when the mass of the cartridge is large, Patent Literature 5 discloses that a lifting-up member (lifter) including a groove that engages with a protrusion formed on the cartridge is provided on the manifold. In this attachment structure, after the cartridge is placed directly under the manifold, the handle is moved to engage the protrusion of the cartridge with the groove of the lifter, and the cartridge is lifted to abut against a connecting portion on the side of the manifold by further moving the lifter by the handle to slide the protrusion along the groove

CITATION LIST

Patent Literature

Patent Literature 1: JP S57-025695 Y
Patent Literature 2: JP S48-076150 A
Patent Literature 3: JP 2011-224481 A
Patent Literature 4: JP 2010-504849 A
Patent Literature 5: JP 2012-501832 A

SUMMARY OF THE INVENTION

Technical Problem

In the attachment structure of Patent Literature 5, it is not necessary to lift the cartridge by hand toward the manifold when installing the cartridge, but when the cartridge is initially positioned directly under the manifold, the orientation of the cartridge must be accurately positioned. Also, the cartridge is lifted using the handle and the lifter as a lever mechanism, but there is a limit to the length of the handle, and if the mass of the cartridge is large, a certain amount of force is required for operation.

An object of the present invention is to provide a cartridge attachment structure that provides good workability in installing and removing a cartridge, prevents liquid leakage at the connecting portion between the manifold and the cartridge, and eliminates the need for independent position adjustment work, and to provide a cartridge suitable for this attachment structure.

Solution to Problem

The attachment structure of cartridge according to the present invention is an attachment structure for detachably installing a cartridge of a tubular shape used in a liquid treatment apparatus to the liquid treatment apparatus, the attachment structure including: a storage space for accommodating the cartridge; a pivot shaft provided along a lower end of an opening of the storage space; a cover whose one end is rotatably attached to the pivot shaft, the cover opening and closing the storage space; a support member rotatably attached to the pivot shaft and arranged on a storage space side of the cover, the supporting member including a bottom support portion holding a bottom surface of the cartridge and a side support portion supporting a side surface of the cartridge; and a pair of lifting-up members attached to the cover parallel to each other to sandwich the cartridge along the side surfaces of the cartridge, wherein a groove which receives a protrusion formed on the side surface of the cartridge is formed on each of inner surfaces facing each other of the pair of lifting-up members such that an end portion of the groove facing a back of the storage space is an open end, and wherein the groove is curved such that the bottom surface of the cartridge moves away from the bottom support portion when the protrusion slides along the groove as the cover rotates about the pivot shaft.

The cartridge according to the present invention is a cartridge of a tubular shape attached to a liquid treatment apparatus by the attachment structure according to the present invention, the cartridge including: a connecting portion provided on a top surface and connectable to a manifold of the liquid treatment apparatus; and a pair of the protrusions provided on a side surface, wherein liquid is communicable between the manifold and an interior of the cartridge via the connecting portion.

Advantageous Effect of Invention

According to the present invention, it is possible to obtain: a cartridge attachment structure that has good workability in attaching and detaching a cartridge, prevents liquid leakage at the connecting portion between the manifold and the cartridge, and eliminates the need for independent position adjustment work; and a cartridge suitable for the attachment structure.

BRIEF DESCRIPTION OF DRAWINGS

FIGS. 3A and 3B are a side view and a perspective view, respectively, illustrating a first cartridge;

FIGS. 4A and 4B are a side view and a perspective view, respectively, illustrating a second cartridge, and FIG. 4C is a perspective view of the second cartridge seen from a direction different from that of FIG. 4B;

DESCRIPTION OF EMBODIMENTS

Next, embodiments of the present invention will be explained. The present invention relates to: an attachment structure for detachably installing a cartridge which is used in a liquid treatment apparatus and stores consumables, to the liquid treatment apparatus; and a cartridge adapted to such an attachment structure. Therefore, in the following embodiments, the attachment structure for a cartridge used in a pure water production apparatus will be described on the assumption that the liquid treatment apparatus is the pure water production apparatus. Of course, the liquid treatment apparatus to which the present invention can be applied is not limited to the pure water production apparatus.

Figure 1A:
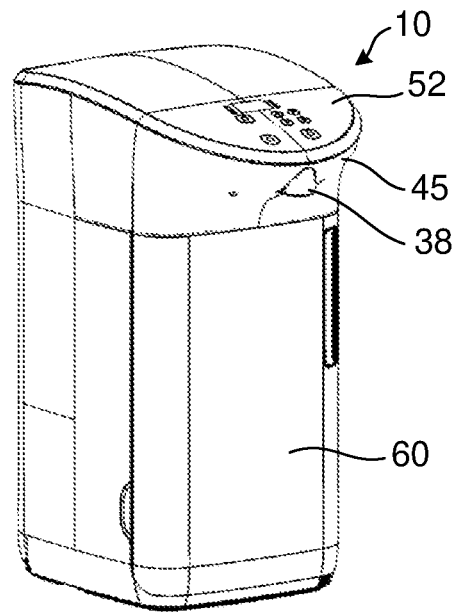
FIGS. 1A and 1B are a perspective view and a side view, respectively, illustrating the appearance of a pure water production apparatus.
Figure 1B:
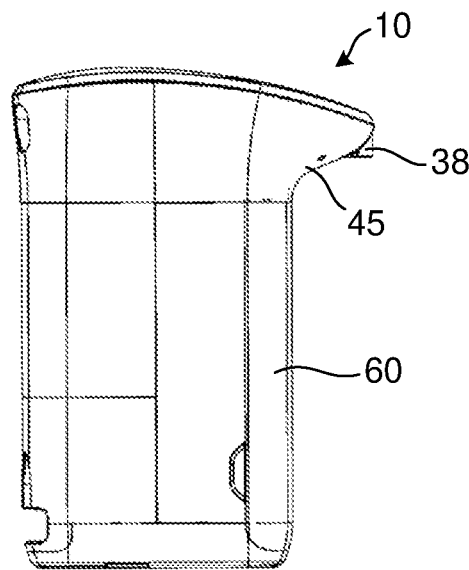
Figure 2:
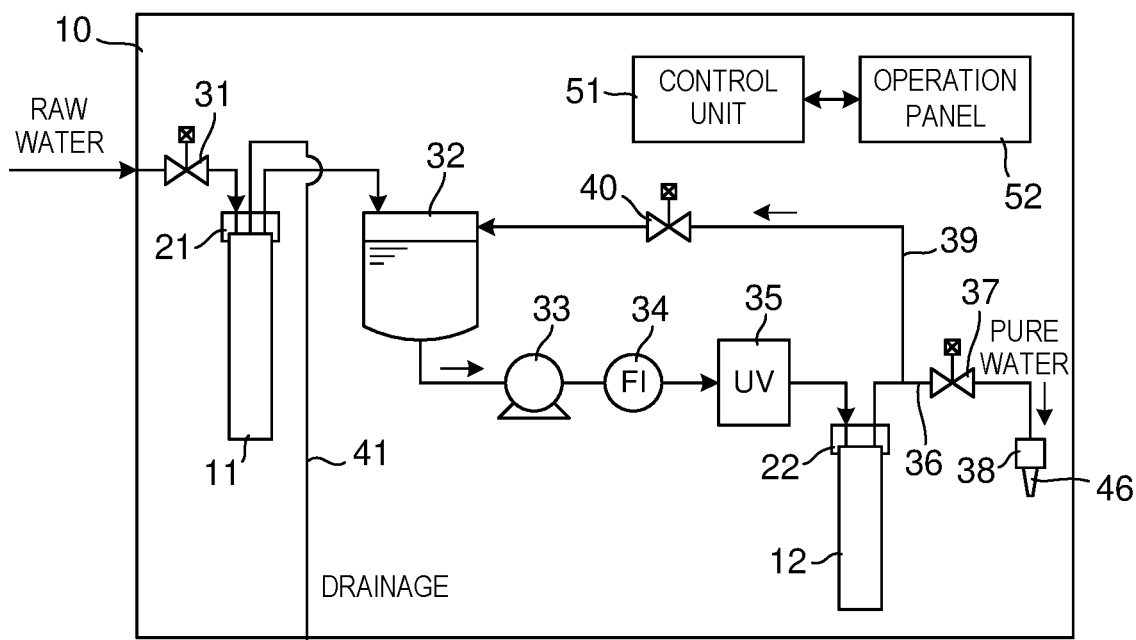
FIG. 2 is a flow diagram illustrating the configuration of the pure water production apparatus.

FIGS. 1A and 1B show the appearance of a pure water production apparatus to which a cartridge attachment structure according to an embodiment of the present invention is applied, and FIG. 2 shows the configuration of this pure water production apparatus. Pure water production apparatus 10 is used, for example, for dispensing pure water into a beaker, a flask or the like in a laboratory, and is configured as a tabletop device. Cartridges 11, 12 containing consumables are detachably attached to pure water production apparatus 10. Manifolds 21, 22 are provided in pure water production apparatus 10 so that cartridges 11, 12 are attached to flow water through cartridges 11, 12. In the example shown here, first cartridge 11 is a cartridge containing a reverse osmosis (RO) membrane and activated carbon, and second cartridge 12 is a cartridge containing an ion exchange resin.

Raw water such as tap water is supplied to pure water production apparatus 10, and supplied raw water 10 is supplied to first cartridge 11 via solenoid valve 31 and manifold 21. In first cartridge 11, the raw water undergoes reverse osmosis treatment with a reverse osmosis membrane and treatment with activated carbon. The treated water from first cartridge 11 is sent to tank 32 via manifold 21. In the reverse osmosis treatment, water that does not pass through the reverse osmosis membrane, that is, concentrated water, is generated, and the concentrated water is discharged as wastewater via pipe 41 from manifold 21. Therefore, first cartridge 11 must have three openings for the entry and exit of water, namely, an inlet for the raw water, an outlet for the treated water, and an outlet for the concentrated water (wastewater). Manifold 21 corresponding to first cartridge 11 is configured such that the three pipes on the main body side of pure water production apparatus 10 are connected to manifold 21 corresponding to these three openings, respectively.

Pump 33 for feeding water stored in tank 32 is connected to tank 32, and flow sensor (FI) 34 and ultraviolet oxidation device (UV) 35 are connected in this order to the outlet of pump 33. Outlet water of ultraviolet oxidation device 35 is passed to second cartridge 12 via manifold 22. Outlet water of second cartridge 12, that is, water that has passed through the ion exchange resin in second cartridge 12 is supplied to outlet pipe 36 via manifold 22. Solenoid valve 37 is provided in outlet pipe 36 and nozzle 46 for discharging pure water is provided at the tip end of outlet pipe 36. Nozzle 46 is detachably attached to nozzle attachment portion 38 that is a channel member that communicates with outlet pipe 36. A nozzle with a distal filter can also be used as nozzle 46. For purpose of explanation, drawings other than FIG. 2 in the accompanying drawings are depicted with nozzle 46 removed from pure water production apparatus 10. Furthermore, in this pure water production apparatus 10, circulation pipe 39 branches from a position upstream of solenoid valve 37 in outlet pipe 36, and the tip end of circulation pipe 39 is connected to tank 32. Circulation pipe 39 is provided to return the outlet water of second cartridge 12 to tank 32 during the period when pure water is not discharged from nozzle 46, and circulation pipe 39 is provided with solenoid valve 40.

Pure water production apparatus 10 is also provided with: control unit 51 that controls the entire pure water production apparatus 10; and operation panel 52 that is electrically connected to control unit 51. Operation panel 52 receives commands for pure water production apparatus 10 from the user, enters the commands to control unit 51, and is further controlled by control unit 51 to present information to the user. Specifically, control unit 52 receives the measured value from flow sensor 34, and controls solenoid valves 31, 37, 40, pump 33 and ultraviolet oxidation device 35 based on the input to operation panel 52.

As shown in FIGS. 1A and 1B, pure water production apparatus 10 has a substantially quadrangular prism shape with rounded corners, and the upper portion on the front side protrudes forward as projecting portion 45. Operation panel 52 is provided on the upper surface of pure water production apparatus 10 at a position where it is easy for the user to operate, specifically on the front side in FIG. 1A. Nozzle attachment portion 38 is provided downward on the lower surface of projecting portion 45 of pure water production apparatus 10 so that nozzle 46 can be attached from below. A portion of the front surface of pure water cleaning device 10 below projecting portion 45 is configured as front door 60 that can be opened and closed or removed.

Next, production of pure water by this pure water production apparatus 10 will be described. Raw water such as tap water is first supplied to first cartridge 11 through solenoid valve 31 and undergoes treatment in a reverse osmosis membrane and treatment with activated carbon, thereby removing a substantial portion of impurities in the raw water. Outlet water from first cartridge 11 is temporarily stored in tank 32 and then supplied to ultraviolet oxidization device 35 as water to be treated. Here, TOC (Total Organic Carbon) components in the water to be treated are decomposed and removed by irradiating the water to be treated with ultraviolet rays. The water to be treated is then supplied to second cartridge 12 and subjected to ion exchange treatment. Since ion components in the water to be treated are removed by this ion exchange treatment, pure water is obtained as outlet water from second cartridge 12. This pure water is discharged from nozzle 46 via supply pipe 36 and solenoid valve 37. Pump 33 is driven even when pure water is not discharged from nozzle 46, and the pure water, which is outlet water of second cartridge 12, is returned to tank 32 via circulation pipe 40. That is, when pure water is not discharged, the pure water circulates from tank 32 to tank 32 through ultraviolet oxidation device 35 and second cartridge 12 functioning as an ion exchange device, thereby preventing the quality of the pure water from deteriorating.

The discharge of pure water from nozzle 46 is performed by the user entering a water dispensing command to operation panel 52. When the water dispensing command is entered, control unit 51 performs control to open solenoid valve 37 and close solenoid valve 40. When stopping the discharge of pure water, control unit 51 performs control to close solenoid valve 37 and open solenoid valve 40. In either case, control unit 51 keeps pump 33 in the driving state.

In pure water production apparatus 10 according to the present embodiment, there are two modes for discharging pure water from nozzle 46: a volumetric dispensing mode; and a continuous dispensing mode (manual dispensing mode), which can be selected by input to operation panel 52. The volumetric dispensing mode is a mode in which a volume of pure water set in advance via the operation panel 51 is discharged from nozzle 46. In the volumetric dispensing mode, when a water dispensing command is entered, control unit 51 performs control to discharge pure water from nozzle 46 until the cumulative value of the flow rate measured by flow sensor 34 reaches the set volume, and when the cumulative value of the flow rate reaches the set volume, control unit 51 performs control to stop the discharging of pure water. On the other hand, in the continuous discharge mode, control unit 51 performs control to start discharging pure water when, for example, a button on operation panel 52 is pressed and then released, and when the button is pressed again and released, control unit 52 performs control to stop the discharging of pure water at that time. In the continuous dispensing mode, control unit 51 can perform control to discharge pure water only while a button on operation panel 52 is being pressed, and to stop the discharging of pure water when the pressing of the button is terminated. By flow sensor 34 measuring the amount of pure water discharged also in the continuous dispensing mode, and sending to a server the total used amount of pure water in the volumetric dispensing mode and the continuous dispensing mode using a communication device for IoT (Internet of Things), it is also possible to manage, on the cloud, the used amount of pure water.

Next, cartridges 11, 12 used in pure water production apparatus 10 according to the present embodiment will be described. First cartridge 11 accommodates a reverse osmosis membrane and activated carbon which are consumables and is configured as a reverse osmosis membrane device and an activated carbon device. Second cartridge 12 houses an ion exchange resin which is a consumable and is configured as an ion exchange device. Both cartridges 11, 12 should be replaced periodically or when the amount of water treated reaches a certain value. When replacing first cartridge 11, it is necessary to close solenoid valve 31 so that the supply of raw water to first cartridge 11 is cut off. When replacing second cartridge 12, it is necessary to stop pump 33 to halt the flow of water to second cartridge 12. Tank 32 generally communicates with the atmosphere via, for example, an air vent filter, and when second cartridge 12 is removed from manifold 22, the water in circulation pipe 39 may flow back toward manifold 22 due to the head difference and water may drip from manifold 22. Therefore, when replacing second cartridge 12, it is preferable not only to stop pump 33 but also to close solenoid valve 40 so that the water in circulation pipe 39 does not flow back.

FIGS. 3A and 3B are side and perspective views, respectively, of first cartridge 11. FIGS. 4A and 4B are side and perspective views, respectively, of second cartridge 12. FIG. 4C is also a perspective view of second cartridge 12, but seen from the opposite side of the view point of FIG. 4B. As shown in these figures, both first cartridge 11 and second cartridge 12 are formed in a tubular shape, and in the illustrated example, they are formed in a cylindrical shape. In the following description, the top surface and bottom surface of each cartridge 11, 12 refer to the top surface and bottom surface of the tubular shape, respectively, and the side surface of each cartridge 11, 12 means the side surface of the tubular shape. The longitudinal direction of cartridges 11, 12 refers to the direction connecting the center of the bottom surface and the center of the top surface. On the top surface of each cartridge 11, 12, connecting portions 15 that connect to manifolds 21, 22 on the main body side of pure water production apparatus 10 are provided. Each connecting portion 15 is a pipe-like member that extends in the longitudinal direction of cartridges 11, 12 and communicates with the inside of cartridge 11, 12. O-ring 15A is fitted in a groove which is formed in the circumferential direction in the outer peripheral surface of each connecting portion 15. When connecting portion 15 is pressed toward manifold 21, 22, it is pushed into manifold 21, 22, and O-ring 15A is crushed and adheres to the inner wall of manifold 21, 22. As a result, liquid can flow between the main body of pure water production apparatus 10 and cartridges 21, 22 without liquid leakage between connecting portions 15 and manifolds 21, 22. Three connection portions 15 are provided in first cartridge 11, and two connection portions 15 are provided in second cartridge 12.

A pair of protrusions 16 are provided on the side surface of each of cartridges 11, 12 at positions close to the top surface so as to face each other with cartridge 11, 12 therebetween. Since the pair of protrusions 16 are points of action when the lift-up operation of cartridges 11, 12 is performed, as will be described later, it is preferable that the pair of protrusions 16 are provided at the positions of both ends of a diameter when cartridges 11, 12 are formed in a cylindrical shape. Further, at a position which is on the side surface of each cartridge 11, 12 and close to the top surface, provided so as to protrude are: first positioning portion 17 used for positioning when installing cartridges 11, 12 on support member 71 as be described later; and second positioning portion 18 formed as a vertically extending ridge that engages with positioning groove 77 (see FIG. 9A) provided on the main body side of pure water producing apparatus 10 when cartridges 11, 12 are installed to pure water production apparatus 10. When cartridges 11, 12 are cylindrical, it is preferable that first positioning portion 17 is arranged at one of the two ends of a diameter orthogonal to the diameter at which the pair of protrusions 16 are arranged and second positioning portion 18 is arranged at the other end.

Figures 5A, 5B:
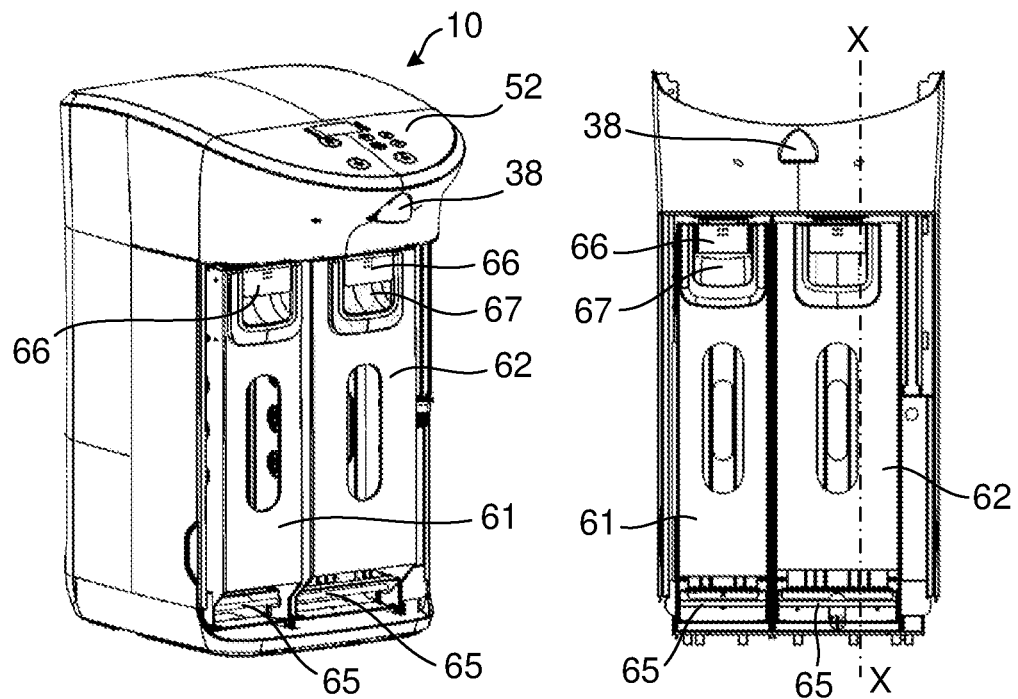
FIGS. 5A and 5B are a perspective view and a front view of the major part, respectively, illustrating the appearance of the pure water production apparatus with a front door removed.
Figure 6:
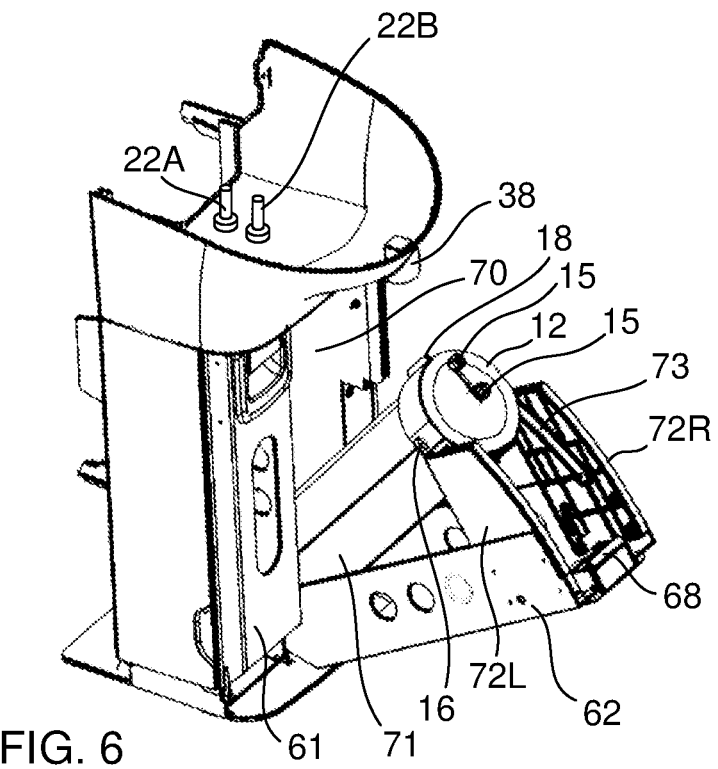
FIG. 6 is a perspective view of the major part illustrating a state in which a cover is opened for installing the cartridge.

Next, the configuration for attaching and detaching cartridges 11, 12 in the present embodiment will be described. When cartridges 11, 12 are attached to or detached from pure water production apparatus 10, the inside of pure water production apparatus 10 is accessed by opening front door 60 or removing it. Therefore, in order to make the description easier to understand, each figure described below is drawn assuming that front door 60 has been removed. FIGS. 5A and 5B are a perspective view showing the appearance and a front view of essential parts, respectively, of pure water production apparatus 10 with front door 60 removed. FIG. 6 is a perspective view of the essential parts of pure water production apparatus 10 with cover 62 opened for installing second cartridge 12. In FIG. 6, the pipes connected to manifolds 22A, 22B, display unit 52, and the like are not shown.

Cartridges 11, 12 are attached to pure water production apparatus 10 in an upright state so that the top surface is vertically upward and the bottom surface is vertically downward when connected to manifolds 21, 22. In order to accommodate cartridges 11, 12 attached in such a manner, pure water production apparatus 10 is provided with storage space 70 for cartridges 11, 12. Openable and closable covers 61, 62 are provided so as to cover storage space 70. A single pivot shaft 65 is provided horizontally along the lower end of the opening of storage space 70, and covers 61, 62 are made rotatable around pivot shaft 65 by pivot shaft 65 passing through covers 61, 62 so that storage space 70 can be closed or opened. Pivot shaft 65 may be provided for each of covers 61, 62. In the example shown in FIGS. 5A and 5B, pivot shaft 65 is provided for each of covers 61, 62. The penetrating position of pivot shaft 65 in covers 61, 62 is one end, that is, the lower end side, of covers 61, 62. Cover 61 on the left side in the figure is a cover that is opened when first cartridge 11 is attached and removed, and cover 62 on the right side in the figure is a cover that is opened when second cartridge 11 is attached and removed. In FIG. 6, cover 61 is closed and cover 62 is opened for installation of second cartridge 12. The upper ends of covers 61, 62 are provided with claws 68 that can be engaged with hooks 76 (see FIG. 9A) on the side of pure water production apparatus 10 to fix covers 61, 62 in the closed position. Claw 68 is biased into a position for engagement with hook 76 by a spring (not shown). Further, covers 61, 62 are provided with handle 66 for pulling claw 68 in when releasing the engagement state with hook 76, and recess 67 into which a finger or the like is inserted when handle 66 is operated. Claw 68, handle 66 and spring (not shown) form a releasable latching mechanism that secures covers 61, 62 in a position to close storage space 70. When opening covers 61, 62 in the closed state, handle 66 is pulled forward. By doing so, claw 68 is released from hook 76, and when handle 66 is pulled forward further, covers 61, 62 are rotated around pivot shaft 65 as is the case of cover 62 on the right side in FIG. 6 so that covers 61, 62 are pulled down to open.

Inside covers 61, 62, support members 71 are provided on which cartridges 11, 12 are placed or supported when cartridges 11, 12 are attached and detached. When covers 61, 62 are closed, support members 71 are located inside storage space 70 and veiled by covers 61, 62. In FIG. 6, support member 71 for second cartridge 12 is illustrated. Although FIG. 2 is illustrated such that one manifold 22 corresponds to two connecting portions 15 of second cartridge 12, two manifolds 22A, 22B respectively corresponding to two connecting portions 15 of second cartridge 12 are more specifically depicted in FIG. 6. With respect to second cartridge 12, the objective of the cartridge attachment structure according to the present invention is to, after placing second cartridge 12 on support member 71 in an oblique state, accurately position connecting portions 15 on manifolds 22A, 22B without directly lifting cartridge 12 by hand, and connect connecting portions 15 to manifolds 22A, 22B. Of course, it is necessary to prevent liquid leakage or the like from occurring between connecting portions 15 and manifolds 22A, 22B. To achieve this goal, cover 62 is provided with lifting-up members 72L, 72R corresponding to the pair of protrusions 16 of cartridge 12, respectively. Details of lifting-up members 72L and 72R will be described later.

Figure 7:
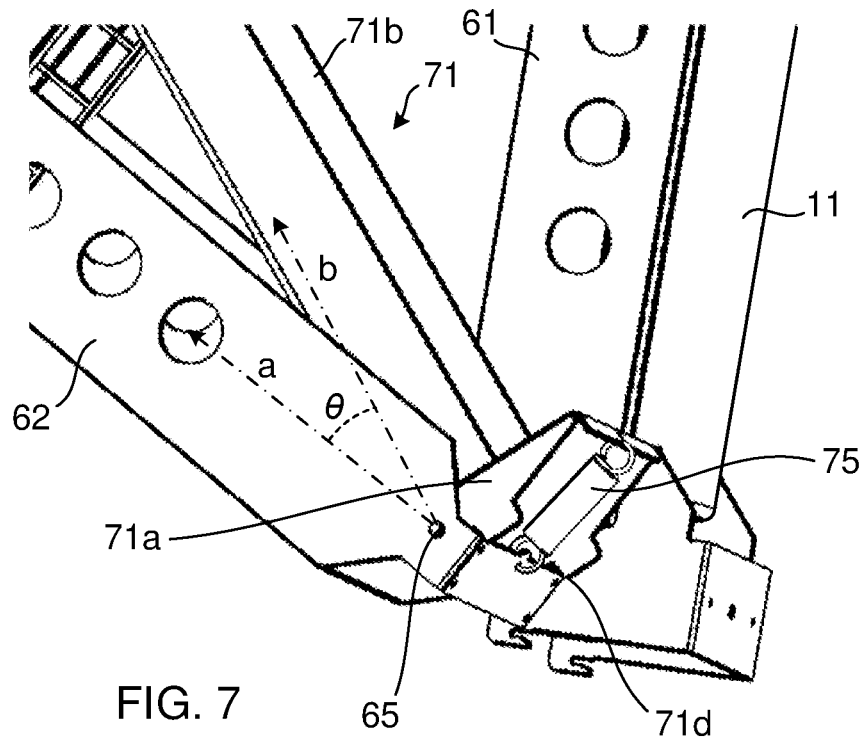
FIG. 7 is a perspective view illustrating the relationship between the cover and the support member around the pivot shaft.

As shown in FIG. 7, support member 71 is a member in which bottom support portion 71a supporting the bottom surface of cartridge 12 and side support portion 71b supporting the side surface of cartridge 12 are formed. Assuming that cartridge 12 has a cylindrical shape, side support portion 71b is a member which bends so that its cross section forms a semicircle, and extends in the longitudinal direction of cartridge 12. Side support portion 71b stands upright with respect to bottom support portion 71a. Pivot shaft 65 passes through bottom support portion 71a in the vicinity of the position where side support portion 71b connects to bottom support portion 71a. As a result, support member 71 can also rotate around pivot shaft 65. Bottom support portion 71a is formed with abutment portion 71d which comes into contact with cover 62 when support member 71 rotates around pivot shaft 65. As a result, as shown in FIG. 7, the angle θ formed by the direction a in which cover 62 extends and the direction b in which side support portion 71b extends when viewed from pivot shaft 65 is limited to a certain angle value or less. Therefore, support member 71 is arranged on the side of storage space 70 of cover 62. Support member 71 is rotatable in a direction toward cover 62, but the lower end of cover 62 and bottom support portion 71 are connected by spring member 75, so that the angle θ is kept constant by spring member 75 when cover 62 is opened as shown in FIG. 6. Notch portion 71c (see FIG. 9A) for receiving first positioning portion 17 of cartridge 12 is provided at the upper end of side support portion 71b as a fitting portion for fitting first positioning portion 17. Notch portion 71c is open on the upper end side of side support portion 71b, and allows cartridge 12 to move away from bottom support portion 71a along side support portion 71b from the state where first positioning portion 17 is fitted in notch portion 71c.

Figure 8:
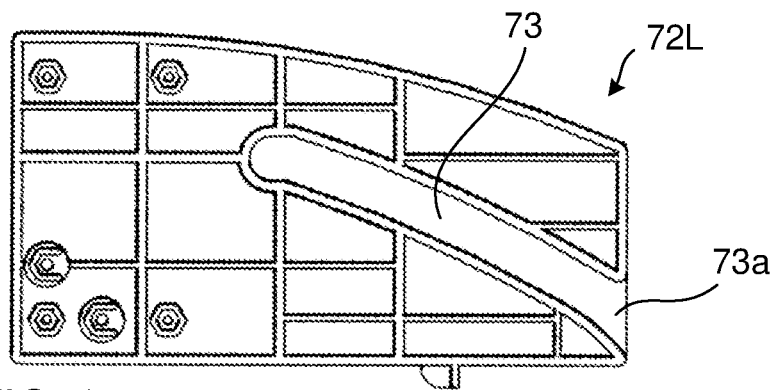
FIG. 8 is a plan view illustrating the lifting-up member.

Lifting-up members 72L, 72R are plate-like members attached to cover 62 so as to extend parallel to each other and to the back side of storage space 70 at an interval equal to or slightly wider than the width of cartridge 12 (the diameter in the case of cylindrical cartridge 12). Grooves 73 for receiving the protrusions 16 of cartridge 12 are formed on the facing inner surfaces of lifting-up members 72L, 72R, as shown in FIG. 8. FIG. 8 shows the inner surface of one lifting-up member 72L, while the inner surface of the other lifting-up member 72R is formed symmetrically with respect to FIG. 8. Grooves 73 are curved. More specifically, assuming that cartridge 12 is placed on support member 71 in a state where the angle θ is maintained at a constant value by spring member 75, groove 73 is formed such that, as the angle θ decreases, the pair of protrusions 16 of cartridge 12 get into the grooves of lifting-up members 72L, 72R and then slide in groves 73 with the side surface of cartridge 12 sandwiched between lifting-up members 72L, 72R. That is, grooves 73 are formed as open ends 73a at the ends of lifting-up members 72L, 72R on the side of storage space 70 so as to receive protrusions 16, the curved shape of groove 73 is such that the distance between groove 73 and pivot shaft 65 is small at the end on the back side of storage space 70, and this distance increases as approaching toward the front side, that is, the surface side on which handle 66 of cover 62 is provided. In other words, groove 73 is curved such that when protrusion 16 of cartridge 12 slides along groove 73 as cover 62 rotates around pivot shaft 65, the bottom surface of cartridge 12 moves away from bottom support portion 71a of support member 71.

Figure 9A:
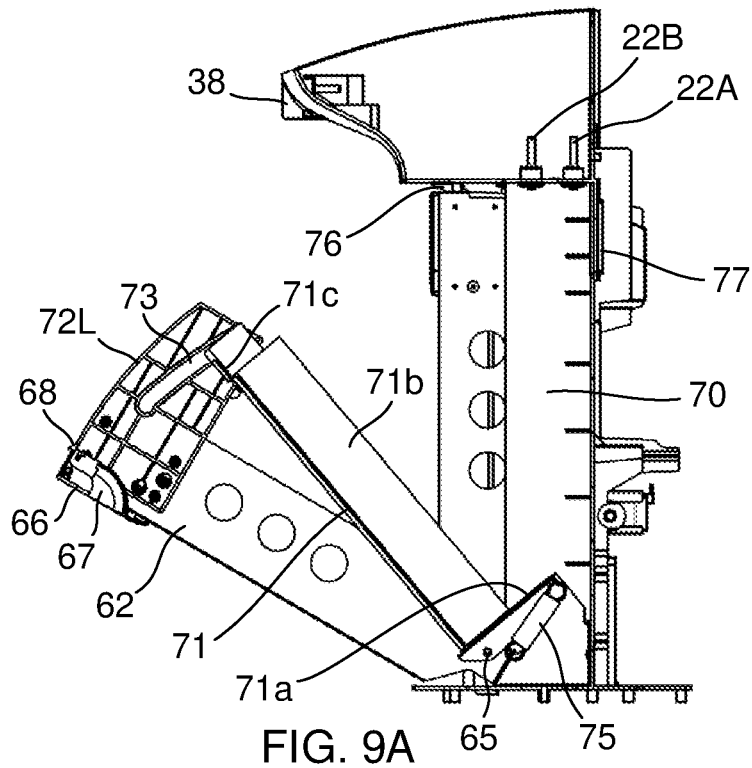
FIGS. 9A and 9B are cross-sectional views illustrating a state in which the cover is opened.
Figure 9B:
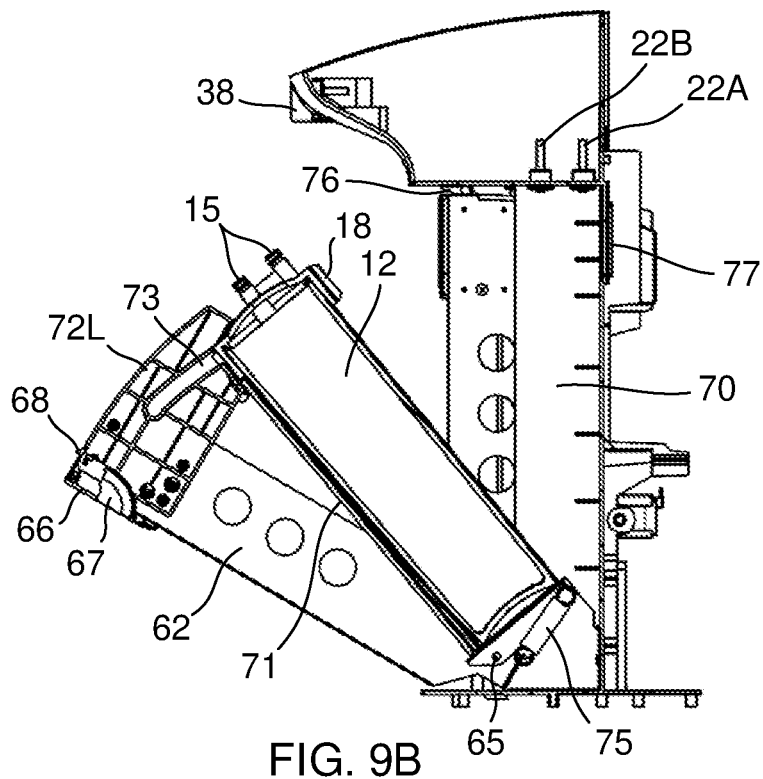

Next, the attachment and detachment operations of cartridges 11, 12 in the present embodiment will be described by taking the attachment of second cartridge 12 as an example. FIGS. 9A and 9B are cross-sectional views of the essential parts of pure water production apparatus 10 with cover 62 opened, as viewed in section X-X in FIG. 5B. FIG. 9A shows a state in which cartridge 12 is not placed on support member 71, and FIG. 9B shows a state in which cartridge 12 is placed on support member 71. If cover 62 is closed when second cartridge 12 is to be attached, claw 68 and hook 76 are disengaged and cover 62 is pulled down toward the front side to enter the state shown in FIG. 9A, by pulling handle 66 of cover 62 forward as described above. In this state, the angle θ formed by the direction in which cover 62 extends across pivot shaft 65, that is, the direction of arrow a in FIG. 7, and the direction in which side support portion 71b of support member 71 extends, that is, the direction of arrow b in FIG. 7, is kept constant by the action of spring member 75.

Next, second cartridge 12 is placed on support member 71 so that first positioning portion 17 of second cartridge 12 fits into notch portion 71c of support member 71. At this time, it is necessary to perform positioning so that first positioning portion 17 is fitted into notch portion 71, but this operation is easily performed only by temporarily placing cartridge 12 on support member 71 which is slanted, and then rotating cartridge 12 in a state in which the bottom surface of cartridge 12 is supported by bottom support portion 71a and the side surface of cartridge 12 is supported by side support portions 71b until cartridge 12 is in the fitted state. By appropriately setting the spring constant of spring member 75, the weight of second cartridge 12 does not cause support member 71 to sink significantly at this time. Also at this time, the pair of protrusions 16 of cartridge 12 are positioned close to the open ends of grooves 73 of lifting-up members 72L, 72R. FIG. 9B shows the state at this time.

Figure 10:
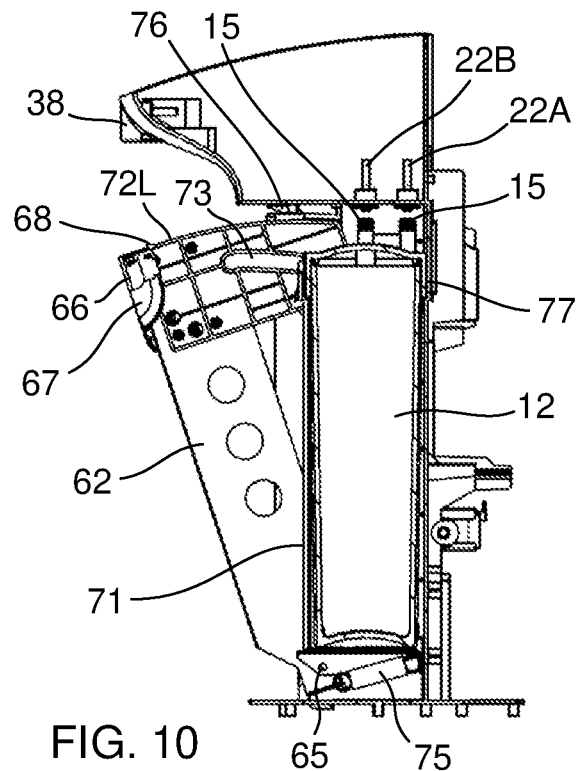
FIG. 10 is a cross-sectional view illustrating a state in which the cover is half-open.

Subsequently, by pushing near handle 66 of cover 62, cover 62 rotates around pivot shaft 65 and moves toward storage space 70. Since the angle θ between the extending direction a of cover 62 and the extending direction b of side support portion 71b of support member 71 is kept constant due to the action of spring member 75, support member 71 also rotates around pivot shaft 65 and cartridge 12 placed on support member 71 also rotates. As a result, cartridge 12 is positioned inside storage space 70. Eventually, cartridge 12 stands upright inside storage space 70, and at that time, cartridge 12 abuts against the back wall of storage space 70, and second positioning portion 18 gets into positioning groove 77 formed in the back wall of storage space 70. Positioning groove 77 is formed to extend vertically, and allows cartridge 12 to move vertically within storage space 70 with second positioning groove 18 getting into positioning groove 77. Since cartridge 12 is in contact with the back wall of storage space 70, cartridge 12 cannot rotate around pivot shaft 65 any more, and support member 71 cannot rotate any more. This state is shown in FIG. 10. FIG. 10 is also a cross-sectional view of the essential parts of pure water production apparatus 10 with cover 62 half-opened, as viewed in section X-X in FIG. 5B. In this state, a gap exists between the connection portions 15 of cartridge 12 and manifolds 22A, 22B provided corresponding to the ceiling portion of storage space 70 in pure water production apparatus 10.

Figure 11:
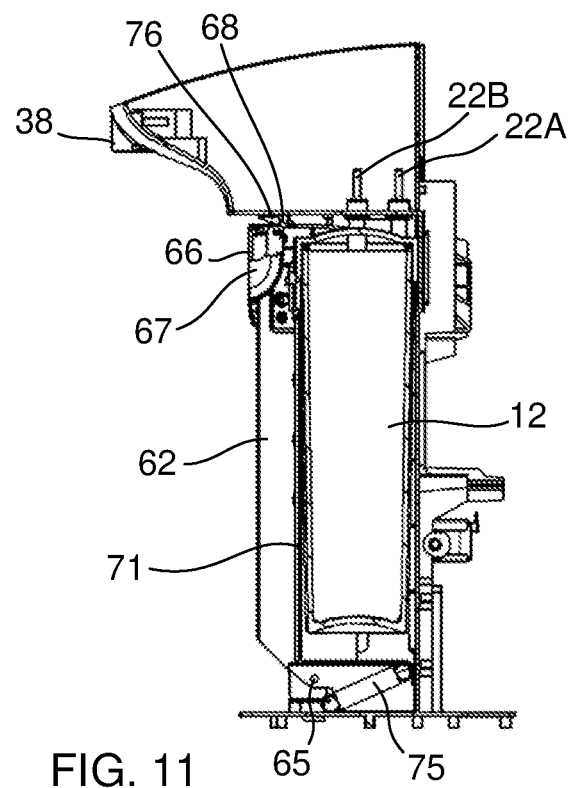
FIG. 11 is a cross-sectional view illustrating a state in which the cover is closed.

When the vicinity of handle 66 of cover 62 is further pushed, support member 71 does not rotate, but cover 62 further rotates around pivot shaft 65 against the biasing force of spring member 75. As a result, the pair of protrusions 16 of cartridge 12 enter grooves 73 formed in the pair of lifting-up members 72L, 72R from the side of the open ends 73a thereof and slide along grooves 73. Since grooves 73 are curved as described above, cartridge 12 is lifted-up away from bottom support portion 71a of support member 71 by sliding of protrusions 16. Further, when cover 62 is pushed in, claw 68 at the tip of cover 62 is pushed into contact with hook 76 on the main body side of pure water production apparatus 10, and when claw 68 passes hook 76, claw 68 returns to its original position to engage hook 76. As a result, cover 62 closes storage space 70 and cover 62 is prevented from opening. Also, in this state, cartridge 13 is fixed within storage space 70 as shown in FIG. 11. FIG. 11 is a cross-sectional view of the essential parts of pure water production apparatus 10 with cover 62 closed, as viewed in section X-X in FIG. 5B. In the state shown in FIG. 11, cartridge 12 is lifted upward by lifting-up members 72L, 72R, and connecting portions 15 of cartridge 12 are pushed into manifolds 22A, 22B. At this time, O-rings 15A provided on the outer peripheral surface of connecting portions 15 are crushed and brought into close contact with the inner walls of manifolds 22A, 22B. As a result, cartridge 12 is in a state that it is attached to pure water production apparatus 10, and the liquid can be circulated between manifolds 22A, 22B and the inside of cartridge 12 without liquid leakage to the outside.

When removing cartridge 12 from the state shown in FIG. 11, handle 66 is pulled to disengage claw 68 from hook 76, and handle 66 is pulled forward further to open cover 62. As a result, cover 62 moves in the direction opposite to that during attachment, so that protrusions 16 of cartridge 12 slide in grooves 73 toward open ends 73a, and cartridge 12 moves downward. When cover 62 is opened to the state shown in FIG. 10, connecting portions 15 of cartridge 12 are separated from manifolds 22A, 22B, and the bottom surface of cartridge 12 comes into contact with bottom support portion 71a of support member 71. By the movement of cover 62 so far, support member 71 does not move due to the action of spring member 75. After that, when cover 62 is further opened, since the angle θ between cover 62 and side support portion 71b of support member 71 is regulated to a certain value or less, support member 71 also rotates around pivot shaft 75 in accordance with the movement of cover 62, and cartridge 12 placed on support member 71 also rotates. Finally, cartridge 12 returns to the state shown in FIG. 9B, so that cartridge 12 can be picked up from support member 71 by hand.

The attachment structure of the cartridges in pure water production apparatus 10 of the present embodiment has been described by taking second cartridge 12 as an example, but first cartridge 11 is also attached in pure water production apparatus 10 with the same attachment structure. Although both cartridges 11, 12 have been described as having a cylindrical shape, the shape of cartridges 11, 12 may not be cylindrical, and may be, for example, a polygonal tubular shape. The consumables stored in cartridges 11, 12 are not limited to activated carbon, reverse osmosis membranes, and ion exchange resins, but may be other consumables. Moreover, the water treatment apparatus to which the present invention can be applied is not limited to the pure water production apparatus, and may be any other apparatus that processes water.

REFERENCE SIGNS LIST

10 Pure water production apparatus;
11, 12 Cartridge;
15 Connecting portion;
15A O-ring;
16 Protrusion;
17, 18 Positioning portion;
21, 22, 22A, 22B Manifold;
61, 62 Cover;
65 Pivot shaft;
70 Storage space;
71 Support member;
72L, 72R Lifting-up member;
73 Groove; and
74 Spring member.

The invention claimed is:

1. An attachment structure for detachably installing a cartridge of a tubular shape used in a liquid treatment apparatus to the liquid treatment apparatus, the attachment structure comprising:
a storage space for accommodating the cartridge;
a pivot shaft provided along a lower end of an opening of the storage space;
a cover whose one end is rotatably attached to the pivot shaft, the cover opening and closing the storage space;
a support member rotatably attached to the pivot shaft and arranged on a storage space side of the cover, the supporting member including a bottom support portion holding a bottom surface of the cartridge and a side support portion supporting a side surface of the cartridge; and
a pair of lifting-up members attached to the cover parallel to each other to sandwich the cartridge along the side surfaces of the cartridge,
wherein a groove which receives a protrusion formed on the side surface of the cartridge is formed on each of inner surfaces facing each other of the pair of lifting-up members such that an end portion of the groove facing a back of the storage space is an open end, and
wherein the groove is curved such that the bottom surface of the cartridge moves away from the bottom support portion when the protrusion slides along the groove as the cover rotates about the pivot shaft.

2. The attachment structure according to claim 1, wherein rotation of the support member is restricted after the cartridge placed on the support member reaches a predetermined position in the storage space as the support member rotates.

3. The attachment structure according to claim 2, wherein the predetermined position is a position in which the cartridge stands upright within the storage space, and the rotation of the support member is restricted as the cartridge abuts against a back wall of the storage space at the position of upright.

4. The attachment structure according to claim 3, wherein a contact portion abutting against the cover is provided on the support member so that an angle formed by a direction from the one end of the cover to a tip end of the cover and an extending direction of the side support portion across the pivot shaft does not exceed a predetermined value.

5. The attachment structure according to claim 4, comprising a spring member connecting the cover to the support member, wherein the spring member maintains the angle such that the protrusion does not enter the groove.

6. The attachment structure according to claim 5, comprising a releasable latch mechanism provided at the tip end of the cover, the latch mechanism fixing the cover at a position that closes the storage space.

7. The attachment structure according to claim 6, wherein the side support portion is provided with a fitting portion that fits into a positioning portion formed on the side surface of the cartridge.

8. The attachment structure according to claim 1, wherein a contact portion abutting against the cover is provided on the support member so that an angle formed by a direction from the one end of the cover to a tip end of the cover and an extending direction of the side support portion across the pivot shaft does not exceed a predetermined value.

9. The attachment structure according to claim 8, comprising a spring member connecting the cover to the support member, wherein the spring member maintains the angle such that the protrusion does not enter the groove.

10. The attachment structure according to claim 1, comprising a releasable latch mechanism provided at a tip end of the cover, the latch mechanism fixing the cover at a position that closes the storage space.

11. The attachment structure according to claim 1, wherein the side support portion is provided with a fitting portion that fits into a positioning portion formed on the side surface of the cartridge.

12. A cartridge of a tubular shape attached to a liquid treatment apparatus by the attachment structure according to claim 1, comprising:
   a connecting portion provided on a top surface and connectable to a manifold of the liquid treatment apparatus; and
   a pair of the protrusions provided on a side surface,
   wherein liquid is communicable between the manifold and an interior of the cartridge via the connecting portion.

13. The cartridge according to claim 12, wherein the cartridge has a cylindrical shape, and the protrusion is provided on the side surface at a position corresponding to each of both ends of a diameter of the cartridge.

14. A cartridge of a tubular shape attached to a liquid treatment apparatus by the attachment structure according to claim 1, comprising:
   a connecting portion provided on a top surface and connectable to a manifold of the liquid treatment apparatus; and
   a pair of the protrusions and a positioning portion provided on the side surface;
   wherein liquid is communicable between the manifold and an interior of the cartridge via the connecting portion.

15. The cartridge according to claim 14, wherein the cartridge has a cylindrical shape, and the pair of protrusions are provided on the side surface at a position corresponding to each of both ends of a diameter of the cartridge.

* * * * *